Feb. 5, 1952     J. H. HURLBUT ET AL     2,584,458
THERMOSTAT SAFETY CONTROL
Filed Jan. 14, 1946     3 Sheets-Sheet 1
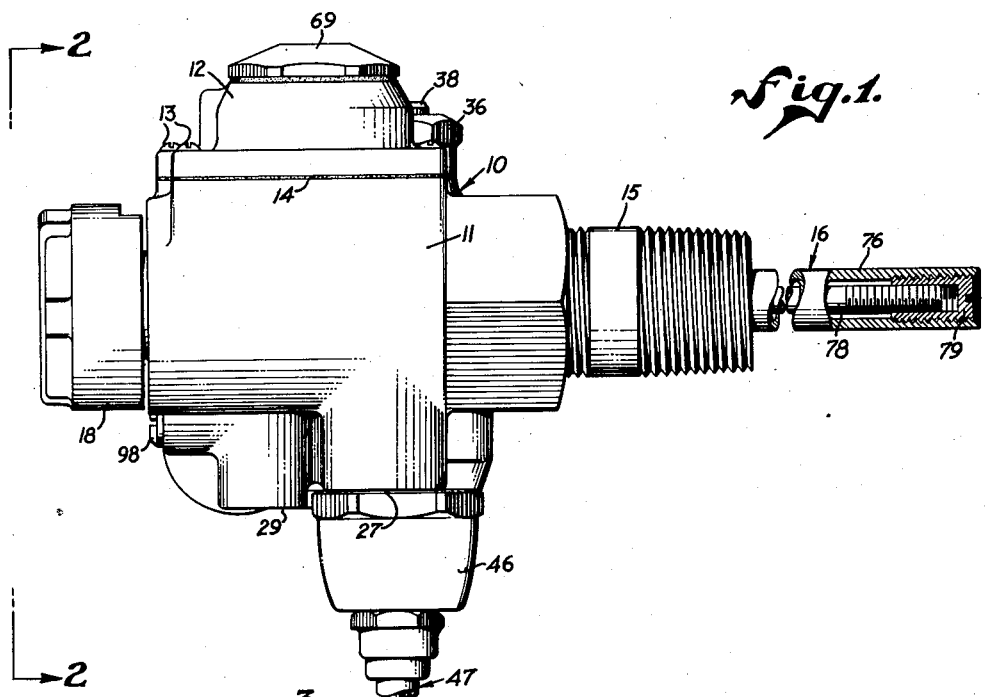
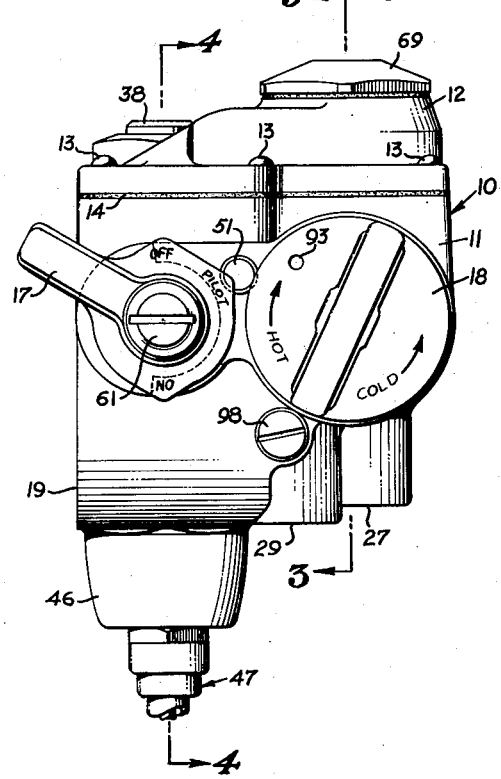
JAMES H. HURLBUT,
CHARLES R. HEININGER,
                INVENTORS.
BY
ATTORNEY.

Feb. 5, 1952    J. H. HURLBUT ET AL    2,584,458
THERMOSTAT SAFETY CONTROL

Filed Jan. 14, 1946    3 Sheets-Sheet 2

JAMES H. HURLBUT,
CHARLES R. HEININGER,
INVENTORS.

BY
Norbert A. Huebner
ATTORNEY.

Feb. 5, 1952   J. H. HURLBUT ET AL   2,584,458
THERMOSTAT SAFETY CONTROL
Filed Jan. 14, 1946   3 Sheets-Sheet 3

JAMES H. HURLBUT,
CHARLES R. HEININGER,
INVENTORS.

BY
Delbert A. Huebner
ATTORNEY.

Patented Feb. 5, 1952

2,584,458

UNITED STATES PATENT OFFICE 2,584,458

THERMOSTAT SAFETY CONTROL

James H. Hurlbut and Charles R. Heininger, Stockton, Calif., assignors, by mesne assignments, to Robertshaw-Fulton Controls Company, Greensburg, Pa.

Application January 14, 1946, Serial No. 641,037

3 Claims. (Cl. 236—21)

The invention relates to gas control units and has particular reference to a thermostat unit capable of controlling the flow of gas to a burner in which is incorporated means for intermittently shutting off the flow of gas to the main burner and a safety feature embodied in separate co-operable means adapted to shut off the entire gas supply under certain conditions.

While it is recognized that thermostat controls for gas-fired appliances are old where they incorporate a combination rod and tube organized to operate a snap action valve mechanism, and while it is also old to provide one type or another of safety valve adapted to shut off gas supply to the appliance, these individual controls have been separately made and separately installed. Combinations of the two which have attempted to bring together in a single unit all of the necessary thermostat and safety control features accompanied by suitable adjustments for the flow of gas lack certain highly desirable features which limit acceptability of the combined structure.

It is, therefore, among the objects of the invention to provide a new and improved unitary control for gas-fired devices wherein thermostat control means and a safety valve are both incorporated into and function as a part of a single mechanism.

Another object of the invention is to provide a new and improved unitary control device in which all necessary chambers and passages for thermostatic and safety control are incorporated and inter-connected in the same casing.

Still another object of the invention is to provide in a unitary thermostatic safety control a safety shut-off device which operates to shut off the entire supply of gas and retain the supply in a shut-off condition until the device can be re-set to permit only the pilot light to be lit.

Another object still is to combine in one unit a safety shut-off valve and a thermostat control so arranged that should the supply of gas be shut off at its source for some reason or other, or in the event that both pilot and main burner should be put out, the entire apparatus will be rendered inoperative and prevented from permitting the flow of gas to resume under any circumstances other than when the device is in pilot position and manually reset.

A further object is to incorporate into a unit device featuring both safety and thermostatic features adjustments permitting regulation of the supply of gas to both the pilot light and the main burner so that the flame desired may be adjusted in each case depending upon the type of gas being used and the pressure at which it is supplied.

Still further among the objects of the invention is to provide a special sealing means for thermostat control featuring the customary expanding rod whereby a positive seal is provided of a design permitting adjustment of the thermostat rod from the exterior of the casing without permitting any portion of the gas to escape through the adjusting means.

It will be apparent from the accompanying drawings and the following description that while many of the elements of structure are familiar to the art of making thermostats and safety controls, old elements and new have been marshalled together in a particular manner to produce a new and novel unitary control incorporating all necessary features and adjustments entirely distinct from anything heretofore produced, easy to fabricate, assemble and operate, more efficient than previous safety control thermostats, and having a usefulness and safety value which will continue indefinitely.

In the drawings:

Figure 1 is a side elevational view of the device including a fragment of a thermostat element in section.

Figure 2 is a front elevational view.

Figure 3:
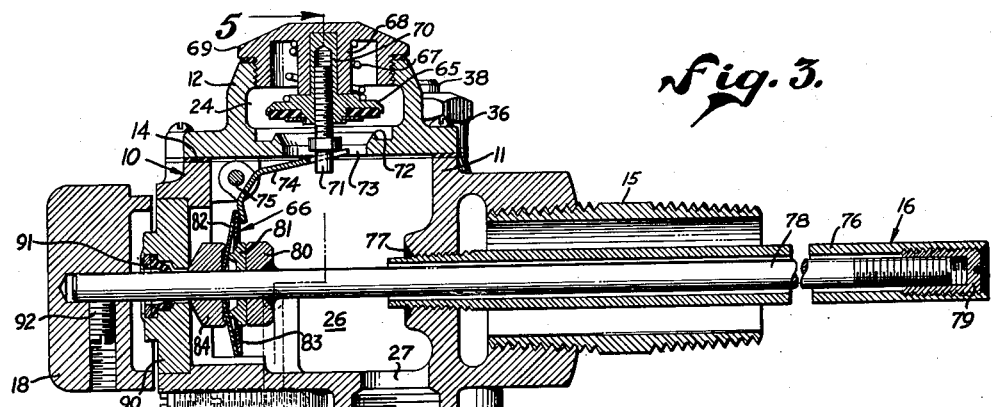
Figure 3 is a longitudinal, sectional view taken on the line 3—3 of Figure 2.

Use of thermostats for controlling the temperature of water in vessels heated by means of a gas has long been established practice, and it is commonly known that satisfactory results can be obtained by use of thermostatic bulb or tube comprising two metals of different coefficients of expansion arranged so that movement of one of them may be translated and magnified by a snap action mechanism so as to open and close a valve in the gas supply line in order that the gas may be turned on when needed for raising the temperature in the vessel and shut off when the temperature has reached a desired amount. The usual way is to provide a main burner for heating the vessel which has incorporated with it a pilot burner, the pilot burner being arranged to continue burning whether the main burner is on or off so as to provide a means of reigniting the main burner.

In gas-fired appliances there is the constant danger that the pilot light might go out while the main burner is out and that when the main burner is turned on again there will be nothing to reignite a large flow of gas which will then escape in quantity sufficient to produce an explosion or fire on the premises.

Even where safety devices are installed to prevent flow of gas to the main burner, whenever the pilot burner is blown out, a sufficient danger arises from unignited gas continuing to flow from the pilot burner to produce a dangerous condition on the premises. While attempts have been made to construct safety valves capable of shutting off the entire gas supply, mechanisms which have heretofore been available have been inadequate and inefficient. The advisability and necessity of combining into one unit both the thermostatic features and a safety feature of such dependability that it will operate in every instance where needed to effect a maximum safety condition in the device has not been adequately recognized. Moreover, there has also been need for a unitary device incorporating both thermostatic and safety features in which is provided all of the necessary adjustments for both pilot gas supply and main burner gas supply so that in servicing the device all parts which may need any adjustment or control can be located in one unit, in one fixed position on any appliance to which it may be attached.

The device is incorporated in a single casing identified generally by the character 10 which consists of a body 11 defining the several chambers, the top of which is closed by a cap or bonnet 12 attached by screws 13 which draw the cap against a suitable gasket 14 in order to seal the connection between the cap and the body. At the rear of the casing is a threaded fitting 15 by means of which the casing may be attached to an appropriate gas heated appliance, the fitting providing a means by which a thermostat bulb assembly member 16 may be extended from the casing into the appliance.

On the front of the casing is provided a handle 17 for controlling the flow of gas into the casing. The handle may, as indicated, be set at either off position, pilot position, or on position, the latter position permitting gas to flow both to a pilot light and a main burner located within the appliance. Also, on the front of the casing is provided an adjusting knob or wheel 18 bearing suitable indicia and adapted to be rotated for adjusting the thermostat assembly member in order to maintain either a hot condition, a normal condition, or a relatively cold condition in the gas heated appliance.

When the device is in operating condition, gas will flow into the casing, through various chambers and valve ports within the casing wherein it is subject to safety and thermostatic control, and thence outwardly from the casing either to a gas line supplying the main burner or to a gas line supplying the pilot burner or to both. In order to simplify this description, the gas lines and burners have been omitted but may be considered as being located within any appliance to which the device may be attached.

Figure 4:
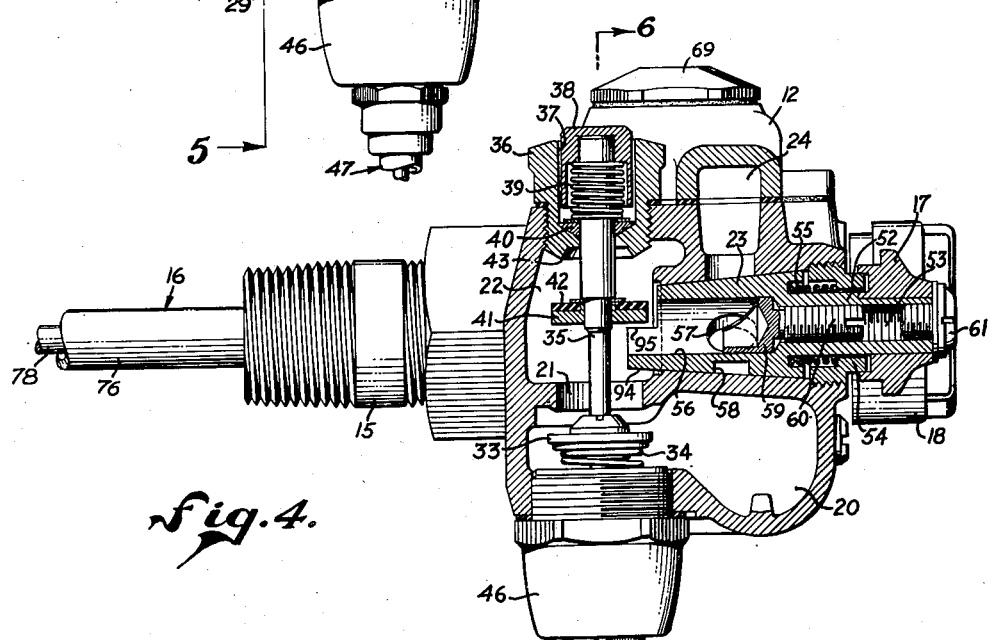
Figure 4 is a longitudinal, sectional view taken on the line 4—4 of Figure 2.
Figure 5:
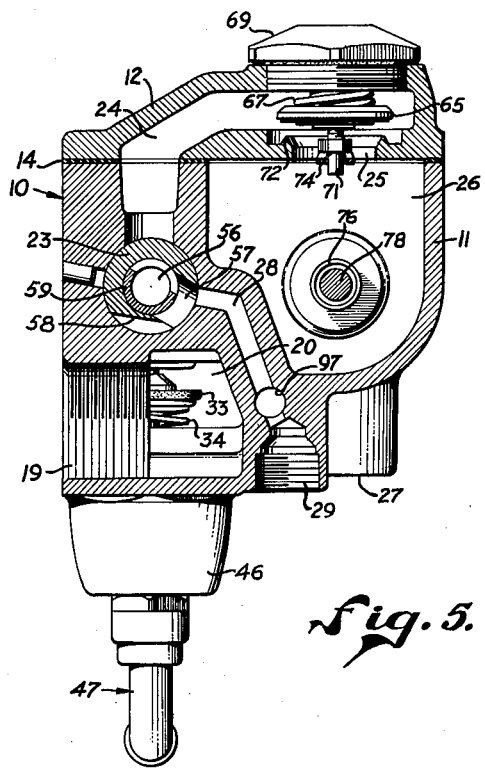
Figure 5 is a cross-sectional view taken on the line 5—5 of Figure 3.

The casing is provided with an inlet port 19 located at the left side of the body, as shown in Figure 5, through which gas passes from a supply line to a primary chamber 20. Gas follows a path through the various interior portions of the casing defined successively by the primary chamber 20, an internal valved port 21, a secondary dispersion chamber 22 (see Figure 4), thence through the interior of a plug valve member 23, from which it travels through a valved passage 24 past a control port 25 into a distributing chamber 26. At the bottom of the distributing chamber is an outlet port 27 (Figure 3) which is adapted to be connected to a gas line supplying the main burner of any appliance with which the unit control may be used. Also, connected to the plug valve member is a pilot passage 28 (Figure 5) which is connected to a pilot outlet 29 in turn adapted to be attached to a gas line supplying a pilot light installed in the same appliance.

In initial position gas is prevented from flowing through the control device by reason of the fact that a safety valve element 33 is pushed to a closed position by a coiled spring 34 located beneath the valve and tending to press the valve upwardly to seat against the lower side of the internal valved port. In order to open the safety valve, there is provided a stem 35 having a limited sliding attachment to the safety valve element. The stem extends outwardly through a packing nut 36 to the exterior of the casing. The packing nut is provided with a pocket 37 within which is positioned a push button 38 attached to the outside end of the valve stem and normally lifted to a distended position by a coiled spring 39. A sealed friction packing 40 is provided at the inside end of the pocket so that gas will not leak past the stem.

To add to the seal where the stem passes through the casing there is provided a sealing disk 41 having a soft face 42 designed to be pressed against an annular rim 43 surrounding the aperture in the lower end of the packing nut. The sealing disk is normally seated upon the annular rim except for a brief moment while the pilot light is being lit.

A thermo-electric magnetic means is provided for holding the safety valve in open position. This device consists of a magnetic coil of somewhat conventional design housed within a fitting 46 which is located beneath the casing and extends threadedly into the primary chamber 20. Within the fitting is located the electromagnetic coil, of standard construction, operable to attract and hold the safety valve element constructed of a suitable metal. For supplying electric current to the electro-magnetic coil there is provided a thermo-couple 47, likewise of previously known construction, and consisting of an outer tube 48 of one kind of metal housing therein and a rod 49 of another kind of metal joined at a point 50 which is adapted to be located near the pilot flame. The thermo-couple is of such construction that when heated an electric current is generated which energizes the electro-magnetic coil in turn attracting and holding the safety valve element.

Figure 6:
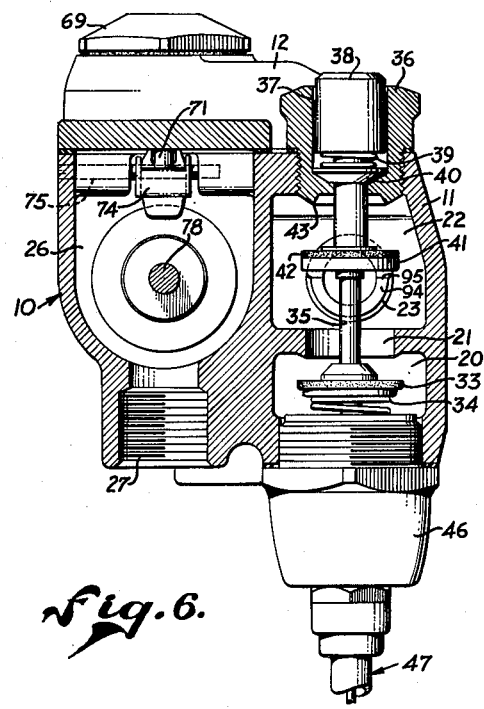
Figure 6 is a cross-sectional view taken on the line 6—6 of Figure 4.

To set the control device so that the safety valve is opened, the push button 38 is pressed downwardly which in turn through the stem 35 depresses the safety valve against spring pressure to the position shown in Figures 4, 5 and 6.

The control device is so arranged that setting of the safety valve element 33 is prevented except when the handle 17 and plug valve member are turned to pilot position. In other positions of the handle 17, namely, off and on positions, it is not possible to depress control button 38 to permit flow of gas through either the main burner or the pilot burner.

While the safety valve is being held down, the pilot flame is lit and permitted to burn until the thermo-couple is heated a sufficient amount. When heating has reached a certain point, sufficient electricity will be generated to energize the electro-magnetic coil which will hold the safety valve element against it, in open position. As soon as this has occurred, pressure on the push button may be released, and the coiled spring 39 will elevate the push button together with the stem which is permitted to slide upwardly relative to the safety valve element. The stem will move upwardly until the sealing disk finds its position against the annular rim 43. The safety valve will then remain open until something occurs to extinguish the pilot light and permit the thermocouple to cool. Upon cooling, the supply of electric energy is cut off and the electro-magnetic coil becomes de-energized releasing the safety valve element which is then pressed upwardly to closed position.

For controlling the flow of gas which passes from the primary chamber through the open valved port 21 into the secondary dispersion chamber for distribution to the burners, there is provided a manual control incorporated in the plug valve 23 which is manipulated by the handle 17. As indicated in Figure 2, the handle has three positions, namely, an off position, a pilot position and an on position wherein gas is supplied to both the pilot and the main burner. The handle is shown in pilot position in Figure 2 wherein the point marked "pilot" is turned to a position opposite a position marker 51. Pilot position of the plug valve member is also illustrated in Figure 5.

The plug valve member shown in Figure 4 is provided with a valve stem 52 having a hollow threaded interior 53 and extending outwardly through a packing gland 54 attached to the casing. Within the packing gland is a coiled spring 55 retained in a suitable recess and adapted to press the plug valve element inwardly into seating position. The handle 17 is non-rotatably attached to the outside end of the valve stem.

As indicated in Figures 4 and 5, the plug valve member is provided with an axial interior passage 56 having a lateral outlet port 57 which communicates between the interior passage and one or another, or both, of passages 24 and 28. On the exterior of the plug valve member is a slot 58 communicating with the outlet port in such a manner that when the lateral outlet port is directed toward the valved passage 24 gas may also pass through the slot to the pilot passage 28.

For controlling the rate of flow of gas to the main burner through the valved passage 24, in the event gas pressure might be changed for one reason or another, there is provided an adjusting plug 59 which has its position within the axial interior passage 56. The adjusting plug has a beveled end so that a gradual, carefully controlled adjustment may be made as the plug is moved to one of several positions partially closing the lateral outlet port. In order to change the adjustment, the plug is provided with a threaded stem 60 engaging the threads within the plug valve stem. A screw driver slot is provided in the stem 60, and access is gained by removal of a cap screw 61 at the outside end of the plug valve stem. After the adjustment is completed, the cap screw is replaced and screwed tight so that the hollow interior of the plug valve stem is sealed against possible escape of gas.

For controlling the flow of gas into the control chamber 26 and thence outwardly to the main burner there is provided a control valve member 65 which is adapted to cooperate with the thermostat bulb assembly member 16 through a snap action mechanism 66. Details of a satisfactory type of snap action mechanism will be found illustrated and explained in Patent No. 2,238,837.

The control valve element is normally urged downwardly to a closed position by means of a coiled spring 67 retained by a spring keeper 68 formed integral with a cap 69, the cap having a sealed position with respect to the casing and in particular to the bonnet 12. The valve element has a stem 70 slideably positioned within a suitable bore inside the spring keeper and is provided with a threaded extension 71 by means of which action of the valve may be adjusted. The valve is adapted to seat upon an annular valve seat 72 surrounding a control valve port 73.

For periodically lifting the control valve from its seat to open position and subsequently permitting it to close, the thermostat bulb assembly member operates through the snap action mechanism which in turn is connected to a bell crank lever 74 pivoted at 75 and engaging the threaded extension 71.

The thermostat bulb assembly member consists in general of an outer tube 76 customarily of copper having a brazed connection 77 to the casing within the control chamber. Within the outer tube is a solid rod 78 usually of a metal designated "invar" which has a coefficient of expansion of close to zero as compared to a high coefficient of expansion of the copper tube. The rod has a threaded connection to a plug 79 at the bottom of the tube so that the rod may be rotated relative to the tube to change its position a slight amount.

Movement of the rod due to temperature changes in the tube is translated to a collar 80 fixed to the rod, the motion of which is transferred through a second collar 81 bearing an annular fulcrum. The fulcrum bears against a snap disk 82, supported by a spider 83, the snap disk co-acting with a third collar 84 in a well-known manner. The rim of the snap disk is thus subjected to movement either against or away from the lower end of the bell crank lever by means of which the control valve is either lifted to open position or permitted to be spring pressed to a closed position.

In the construction shown in Figure 3 the "invar" rod extends outwardly through a packing plug 90 sealed in the casing. At the center of the packing plug is a packing gland 91 which fits snugly around the exterior of the protruding portion of the "invar" rod. The wheel 18 is fixed to the outside end of the rod by means of a set screw 92. By rotation of the wheel the rod may be threaded inwardly or outwardly with relation to the copper tube in order to change the setting at which the snap disk will operate. As indicated on the face of the wheel, and as shown in Figure 2, the wheel may be turned to the hot adjustment. When desired, the wheel may also be turned to a normal adjustment identified by a dot 93 or to a cold adjustment.

To prevent the setting or opening of the safety valve at some positions and to permit the setting or opening of the safety valve at other positions the plug valve member is provided with an end extension 94 which may be designated as a cam, the extension being cut away forming shelves or shoulders 95, one on each side. Figures 4 and 5 show the plug valve member rotated to pilot position. In this position the cam is rotated so that the cut-away portion faces upwardly and permits movement of the sealing disk 41 to the position shown in Figure 4, in which position the valve stem 31 and safety valve element 33 are depressed, thereby opening the internal valved port 21. This can happen only in pilot position of the plug valve member.

Should the plug valve member be rotated to on position, one of the shelves will be rotated to an upward position so that the cam 94 will block downward movement of the sealing disk 41. Consequently, as long as the plug valve member is turned to full on position, which would mean the opening of the main burner outlet port as well as the pilot outlet port, it will be impossible to depress the valve stem 35 and therefor impossible to open the safety valve 33. Under this circumstance no gas will flow from the pilot outlet port to permit lighting the pilot.

The same blocking of movement of the valve stem 35 by the sealing disk occurs when the handle and plug valve element are rotated to off position. It will be apparent from the preceding description that once the pilot has been lit and the safety valve element retained in open position by the electro-magnetic coil, the sealing disk and stem 35 will be spring pressed automatically to an upward position, and the handle and plug valve may then be rotated from the pilot position shown in Figure 4 to either off position or on position without the sealing disk interfering with rotation of the cam 94. Once the pilot passage has been opened so that gas may flow to the pilot light, the flow of gas may be regulated in quantity by means of an adjusting screw 96 sealed within a threaded bore 97 by a sealing plug 98.

Figure 7:
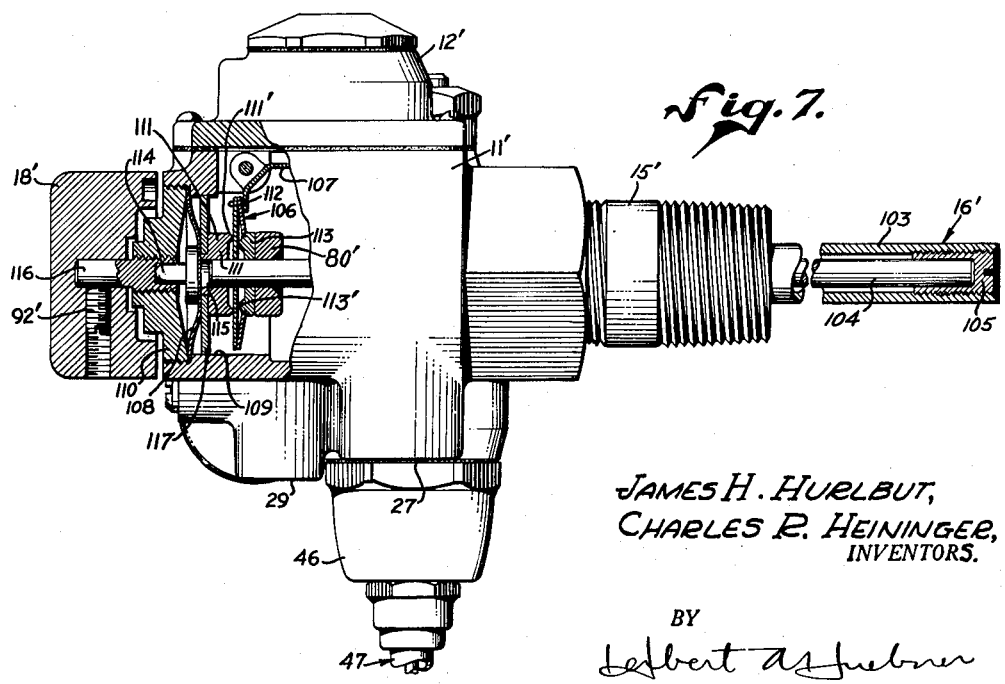
Figure 7 is a side view of a modified form of the device with a portion of the casing broken away showing the interior construction.

In a modified form of the device shown in Figure 7 means is provided for replacing a friction sealed packing for the "invar" rod with a positive sealing device.

In the modified form a casing having a body 11' and a cap or bonnet 12' is provided with a usual fitting 15' for attaching the device to a gas heated appliance in a manner permitting a thermostat bulb 16' to be inserted into an appropriate portion of the appliance. In this instance the thermostat bulb comprises a tubular member 103 within which is positioned the customary "invar" rod 104, in this instance fixed in location with respect to the tube by providing the rod with a tight fit within a sealed plug 105.

The rod is provided with a suitable snap action mechanism 106 similar to the snap action mechanism in the first described form and operable through a bell crank lever 107 to manipulate the control valve.

The modified form differs from the first described form in that there is provided a diaphragm 108 which makes a gas tight seal across a control port 109. The diaphragm is held in place and sealed at its perimeter by a threaded plug 110. The diaphragm may be a thin, metallic element which is permitted a certain freedom of movement at the center in a lateral direction to make possible an adjustment of the snap action mechanism.

For supporting and centering the snap action mechanism there is provided a disk 117 which is mounted for sliding movement along the wall of the passage which opens into the control port. The disk is fixed to a collar 111 which is equipped with a fulcrum 111' bearing upon a snap disk 112. The collar is adapted to move against the disk thereby to alter the adjustment of the snap action mechanism. Upon the rod 104 is affixed a collar 80' and adjacent thereto is a second collar 113 which is moved by the rod and attached collar 80'. The collar 113 is provided with a fulcrum 113', the point of action of which is opposed and laterally spaced from the point of action of the fulcrum 111'. When the collar 111 is moved relative to the collar 113, the setting of the snap action mechanism is changed.

For moving the collar 111 there is provided a center pin 114 on the side of the diaphragm opposite from the collar 111, the center pin being adapted to be received within a cup-like recess in the inside end of an adjusting pin 116. The adjusting pin in turn is fixed in position on a handle wheel 18' by means of a set screw 92'. The adjusting pin has a threaded engagement with the threaded plug 110.

Therefore, when the adjusting pin is rotated by means of the handle wheel, it will shift its position endwise, and when moved inwardly will press the adjusting pin against the diaphragm. This motion will shift the position of the center of the diaphragm inwardly and be translated to the collar 111 pressing the collar inwardly and thus change the setting of the snap action mechanism. When the adjusting pin is moved in an opposite direction, the setting of the snap action mechanism will undergo a change in the opposite direction by reason of tension inherent within the mechanism itself.

In operation of the device the handle wheel or knob 18, or the wheel 18' if the modified form is being considered, will customarily be set at normal position wherein the dot 93 will be positioned opposite the position marker 51 or in cold position if preferred. Since the thermostat bulb is cold at this stage, in either position the control valve will ordinarily open, thereby permitting a potential flow of gas outwardly through the main burner outlet port.

To ignite the pilot light in the appliance it is necessary to turn the handle 17 to pilot position and then depress the button 38 to push the safety valve 33 to open position against or near the electro-magnetic coil. In pilot position the plug valve will be rotated to the position shown in Figure 5 where it will be apparent that gas may flow from the dispersion chamber 22 through the axial passage 56 of the plug valve member, thence outwardly through the lateral port 57 to the pilot passage 28 and pilot outlet port 29. The pilot burner may then be lit, and heat generated will be transformed into electricity by means of the thermo-couple 47 and hold the safety valve in open position, whereby gas flowing into the device through the inlet port will be available to be passed through the device depending upon how other controlling valves are set.

As long as the handle 17 remains in pilot position, no gas can flow to the main burner outlet port. However, after the pilot has been ignited, the handle may be turned to full on position, and gas will then be permitted to pass through the plug valve member through both the valved passage 24 and the pilot passage 28. The pilot outlet port will continue to be supplied, and gas will also be available for the main burner. Since in normal position of the wheel or knob 18 the control valve will be open, gas will immediately pass into the control chamber 26 and thence outwardly through the outlet port to the main burner which in turn may be ignited by the pilot.

As the appliance heats up the thermostat bulb will be heated, and when a sufficient temperature has been reached, the snap action control 66 will be operated to release the control valve member 65 to a spring pressed closed position, thereby shutting off flow of gas to the main burner. Later, as the appliance cools off, the thermostat bulb will again function in an opposite direction causing actuation of the snap action mechanism in a contrary direction to open the control valve member causing gas to again flow through the main burner outlet port. Meanwhile, the thermostat action may be altered by rotation of the wheel 18 in one direction or another.

If the handle 17 should then be turned to full off position, gas flow to both the pilot outlet port and the main burner outlet port would be shut off. As soon as the pilot ceases to burn, the thermocouple 47 cools, acting through the electro-magnetic coil to release the safety valve 33 to a closed position. The pilot cannot again be ignited by any means until the handle 17 is rotated to pilot position.

If instead of turning the handle 17 to off position the pilot flame were inadvertently put out while the handle is turned to full on position, the thermo-couple upon cooling would interrupt energization of the electro-magnetic coil and in this instance also release the safety valve, permitting it to close and shut off the entire gas supply to both pilot and main burner outlet ports. Cooling takes place with sufficient promptness so that no appreciable quantity of unignited gas will escape. In this instance likewise the device cannot again be put into operation until the handle 17 is again rotated to pilot position.

By provision of a unitary control of the type described incorporating in cooperable relationship in one casing a thermostat control, a safety control, and necessary main burner and pilot adjustments, there is provided a unitary control device which can be conveniently located on a gas-fired appliance wherein all controls for handling the flow of gas may be tightly sealed and made easily accessible. Full control being thereby localized, problems of adjustment and servicing are minimized. By placing all controls within a single unit, all adjustments may be readily made in the shop before the unit is incorporated into an appliance. Adjustments are, however, made readily accessible. Should conditions change in the field, settings may be varied in order to accommodate the device to the changed conditions. The device is positive in its action and effective of maximum safety regulation in that the gas supply is completely shut off whenever the pilot light is extinguished and cannot be renewed except under conditions of maximum safety.

Although the invention is herein shown and described in what is conceived to be the most practical and preferred embodiment, it is recognized that departures may be made therefrom within the scope of the invention, which is not to be limited to the details disclosed herein, but is to be accorded the full scope of the claims so as to embrace any and all equivalent devices.

The invention having been herein described, what is claimed and sought to be secured by Letters Patent is:

1. Control apparatus for gaseous fuel burners having main and pilot burners, comprising a casing having an inlet and a pair of outlet openings, one said outlet opening being adapted for connection to the main burner and the other said outlet opening being adapted for connection to the pilot burner, a main shut-off cock positioned in said casing between said inlet and said outlet openings and rotatable to a full-open position for supply of fuel to both the main and pilot burners, said cock having a pilot position wherein supply of fuel to the main burner is prevented, electromagnetic safety means biased to a position for preventing flow of fuel through at least the outlet opening connected to the main burner, thermoelectric means responsive to a flame at the pilot burner for energizing said safety means for holding the same in a position wherein said fuel flow is permitted, reset means positioned adjacent one end of said cock and coaxial of said safety means for movement transversely of the axis of said cock, thermostatic means having an element extending on an axis substantially parallel with the axis of said cock and extending through said casing, snap-action means operatively connected to said element intermediate the ends thereof, a control valve member movable between positions by said snap-action means on an axis substantially parallel with said safety means and in response to conditions established by operation of the main burner, and individual adjusting means for said element of said thermostatic means and for said cock respectively and being positioned exterior of said casing in side-by-side relation.

2. Control apparatus as claimed in claim 1 wherein said thermostatic means includes a rod and tube type element extending on an axis substantially parallel with the axis of said cock, said snap-action means carried by said rod including a snap-disc adapted to reverse its contour during said snap-action, and a bell-crank lever operative between said disc and said control valve member for transmitting movement therebetween.

3. Control apparatus as claimed in claim 2 wherein said rod of said rod and tube element extends through said casing and said adjusting means for said element of said thermostatic means includes a handle secured to the end of said rod.

JAMES H. HURLBUT.
CHARLES R. HEININGER.

REFERENCES CITED

The following references are of record in the file of this patent:

UNITED STATES PATENTS

| Number | Name | Date |
| --- | --- | --- |
| 1,941,795 | Grayson | Jan. 2, 1934 |
| 1,952,440 | Kelley | Mar. 27, 1934 |
| 2,201,398 | Grayson | May 21, 1940 |
| 2,201,399 | Jackson | May 21, 1940 |
| 2,210,446 | Cerny | Aug. 6, 1940 |
| 2,213,844 | Mantz | Sept. 3, 1940 |
| 2,328,642 | Green et al. | Sept. 7, 1943 |
| 2,353,759 | Ray | July 18, 1944 |
| 2,361,944 | Jackson et al. | Nov. 7, 1944 |
| 2,372,537 | Wantz | Mar. 27, 1945 |
| 2,414,220 | Alfery | Jan. 14, 1947 |